US012152415B2

(12) United States Patent
Wilke

(10) Patent No.: US 12,152,415 B2
(45) Date of Patent: Nov. 26, 2024

(54) DOOR HANDLE ASSEMBLY FOR A VEHICLE AND METHOD FOR MOUNTING A DOOR HANDLE ASSEMBLY

(71) Applicant: ILLINOIS TOOL WORKS INC., Glenview, IL (US)

(72) Inventor: Zsolt Wilke, Bad Mergentheim (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 215 days.

(21) Appl. No.: 17/551,741

(22) Filed: Dec. 15, 2021

(65) Prior Publication Data

US 2022/0186530 A1 Jun. 16, 2022

(30) Foreign Application Priority Data

Dec. 16, 2020 (DE) ..................... 10 2020 133 812.0
Mar. 22, 2021 (DE) ..................... 10 2021 107 005.8

(51) Int. Cl.
*E05B 79/06* (2014.01)
*E05B 85/16* (2014.01)

(52) U.S. Cl.
CPC .............. *E05B 79/06* (2013.01); *E05B 85/16* (2013.01)

(58) Field of Classification Search
CPC .......... E05B 79/06; E05B 85/16; E05B 85/12; E05B 85/14
See application file for complete search history.

(56) References Cited

U.S. PATENT DOCUMENTS 4,343,501 A * 8/1982 Meeks .................... E05B 85/12
292/DIG. 31

* cited by examiner

*Primary Examiner* — Kristina R Fulton
*Assistant Examiner* — Thomas L Neubauer
(74) *Attorney, Agent, or Firm* — THOMPSON HINE LLP

(57) ABSTRACT

A door handle assembly (1) for a vehicle, wherein the door handle assembly includes a handle support (2) and a grip (3) for opening a door or flap of the vehicle, wherein the door handle assembly is configured in order to be transferable between a mounting state and an operating state, wherein, in the mounting state of the door handle assembly, at least one first end region (4) of the grip (3) can be inserted or plugged into a receiving region (5) formed in the handle support (2) and in particular configured in order to be channel- or shaft-shaped, and wherein, in the operating state of the door handle assembly, the grip (3) is pivotably mounted relative to the handle support (2) via a pivot bearing formed during the change from the mounting state to the operating state about a pivot axis specified by the pivot bearing.

12 Claims, 11 Drawing Sheets

DOOR HANDLE ASSEMBLY FOR A VEHICLE AND METHOD FOR MOUNTING A DOOR HANDLE ASSEMBLY

TECHNICAL FIELD

The present invention relates to a door handle assembly for vehicles, wherein the door handle assembly has a handle support and a grip for opening a door or a flap of the vehicle.

Such a door handle assembly can be configured as an inner or outer handle, wherein the present invention primarily relates to a door handle assembly for an inner handle.

For such door handle assemblies, there are a variety of different designs and embodiments. The embodiment of a door handle according to the invention relates to such embodiments in which the handle support on the one hand and the grip on the other hand are fastened to one another from opposite sides to the door or flap of the vehicle. The handle support is fastened to the rear of the door or flap, that is to say on the outside or inside of the vehicle, while the grip is mounted from the inside or outside of the door or flap, that is to say on the inside or outside of the vehicle. After mounting, at least one handle end of the grip penetrates a recess in the door or flap of the vehicle.

There are also door handle assemblies of other types, in which the grip is first pre-mounted with the handle support into a complete unit. After pre-mounting, the unit is subsequently mounted in a section of the door or flap of the vehicle, for which purpose it can be passed through the section of the door or flap by a setting motion from the outside of the door. The handle support has locking elements that are in an ineffective position and reach the rear of the door or flap while edge zones of the handle support are supported on the outside of the door. The locking elements are then transferred into their effective position, where they engage with the rear of the door or flap and thus fasten the component onto the door or the flap.

The present invention relates in particular to door handle assemblies in which the grip serving as the actuation portion can be pivoted about a fixed pivot axis, in particular in the form of a handle lever. A defined opening and closing movement of the grip is thus specified.

In practice, in such door handle assemblies, unavoidable dimensional and mounting tolerances occur between individual components of the door handle assembly or between the door handle assembly and body parts to be connected thereto. For example, body parts and door handle assemblies to be fastened thereto are often manufactured and mounted by different companies.

SUMMARY

Accordingly, the problem addressed the invention is to specify a door handle assembly, in particular for the internal actuation of a vehicle door, in which the mounting of the door handle assembly is reduced in cost. In particular, the problem addressed by the invention is to create a solution that provides, in a constructively simple manner, a door handle assembly that is inexpensive to manufacture and in which the grip can be easily, quickly, and conveniently mounted on the handle support.

This problem is solved according to the invention by the subject matter of independent claim 1, wherein advantageous further developments of the door handle assembly according to the invention are specified in the dependent claims 2 to 12.

Accordingly, the invention relates in particular to a door handle assembly for a vehicle, wherein the door handle assembly comprises a handle support and an actuation portion in the form of a grip for opening a door or flap of the vehicle. In particular, it is provided that the door handle assembly is configured in order to be transferable between a mounting state and an operating state.

In the mounting state of the door handle assembly, a first end region of the grip can be inserted or plugged into a receiving region, which is formed in the handle support and configured, in particular, to be channel- or shaft-shaped.

In the operating state of the door handle assembly, on the other hand, the grip is pivotably mounted relative to the handle support via a pivot bearing formed during the change from the mounting state to the operating state about a pivot axis specified by the pivot bearing.

The mounting time of the door handle assembly is significantly reduced, because, in the mounting state of the door handle assembly, only the first end region of the grip must be inserted, and in particular plugged, into the in particular channel- or shaft-shaped receiving region formed in the handle support. The plugging movement is preferably guided through the walls of the receiving region, which is in particular channel- or shaft-shaped.

Due to the insertion or plugging of the first end region of the grip, the door handle assembly changes from the mounting state into the operating state. During this process, as explained in more detail below, a pivot bearing is formed independently, about which the grip is pivotably mounted relative to the handle support in the operating state of the door handle assembly.

The grip serving as the actuating portion of the door handle assembly according to the invention can be a handle portion, for example. For example, it can be a handle lever pivotably mounted on the handle support in the operating state of the door handle assembly. The grip serving as the actuating portion can be configured in order to be grasped by an operator and, in particular, a vehicle occupant (provided the door handle assembly is an inner door handle assembly) to open and/or close a vehicle door, in particular from the inside.

The handle support of the door handle assembly can be configured at least regionally as a housing. The handle support and the grip of the door handle assembly preferably consist of components made of plastic material, in particular.

The door handle assembly according to the invention is characterized, in particular, in that it can be mounted manually on the vehicle door, that is to say as part of a hand-mounting. For this purpose, it is provided in particular that, in the mounting state of the door handle assembly, the handle support of the door handle assembly is mounted on the vehicle door and in particular on a body component or on an inner and/or outer surface or outer skin of the door on the rear, that is to say, proceeding from the so-called B-side, and, in particular, fastened to the vehicle door.

The mounting of the grip of the door handle assembly on the handle support is then carried out, wherein this is, in particular, a front-side mounting of the grip in which the grip is fastened/mounted proceeding from the so-called A-side of the vehicle door to the handle support arranged/affixed on the B-side of the vehicle door. As already stated, it is provided for this purpose that a first end region of the grip is inserted or plugged into a receiving region formed in the handle support and configured, in particular, in a channel- or shaft-shaped manner, as a result of which the grip is transferred into its operating state and the pivot bearing, about which the grip is pivotably mounted relative to the handle support, is configured.

In particular, it is provided in this context that, in order to mount the grip, a region (first end region) of the grip is inserted into a receptacle, in particular an opening, of the handle support and then a bearing of the grip, which bearing can be pivoted relative to the handle support, is formed.

The handle support preferably comprises a mounting aid based in particular on the poker joke principle, which aid is configured and/or arranged in view of the region to be inserted/plugged during the mounting of the door handle assembly into the receiving region formed in the handle support and configured in particular to be channel- or shaft-shaped, such that during the mounting of the door handle assembly, only a previously determined or determinable region of the grip, and preferably only a previously determined or determinable orientation with respect to the handle support, can be inserted into the particularly channel- or shaft-shaped housing of the handle support.

In the operating state of the door handle assembly, the first end region of the grip is pivotably mounted relative to the handle support via the pivot bearing formed during the change from the mounting state to the operating state. The pivot bearing formed in the operating state comprises at least one bearing pin or bearing journal, which interacts with a bearing eye formed or provided in or on the first end region and associated with the at least one bearing pin or bearing journal in such a way that a corresponding pivot bearing is formed for pivotably bearing the grip relative to the handle support.

According to preferred realizations of the door handle assembly according to the invention, it is provided that the door handle assembly comprises a mounting element, which is configured in order to be transferable between a mounting state and an operating state. The mounting element is configured in particular in order to form the pivot bearing for pivotably bearing the grip relative to the handle support when changing from the mounting state to the operating state.

In this context, it is provided in particular that the mounting element is configured in order to manipulate the at least one bearing pin or bearing bolt and/or the at least one bearing eye associated with the at least one bearing pin or bearing bolt when changing from the mounting state to the operating state such that the pivot bearing is configured in order to pivotably bear the grip relative to the handle support with the at least one bearing pin or bearing bolt and the at least one associated bearing eye.

Preferably, the handle support comprises two mutually opposed bearing pins or bearing bolts, which are movably, and in particular slidably, held in the direction of a pivot axis specified by the pivot axis that is formed during the change from the mounting state to the operating state of the door handle assembly. When transferring the mounting element from its mounting position into its operating position, the mounting element manipulates the bearing pin or bearing bolt such that they are moved in the direction of the pivot axis specified by the pivot bearing formed during the change from the mounting state to the operating state of the door handle assembly, such that, ultimately, the pivot bearing is formed in or at the first end region of the grip with the bearing pin or bearing bolt.

For the manipulation of the bearing pin or the bearing bolt such that it is moved in the direction of the pivot axis specified by the pivot bearing in order to ultimately form the pivot bearing, various approaches are possible.

In this context, for example, it is conceivable that the bearing pin or bearing bolt comprises a pin head or bolt head having an insertion slope, wherein the mounting element comprises a region configured in order to be complementary to the insertion slope, preferably regionally, in particular such that when the mounting element is transferred out of its mounting position into its operating position, the result is an at least partial rotational movement of the mounting element into a particularly linear displacement of the at least one bearing pin or bearing bolt in the direction of the pivot axis.

Alternatively or in addition, it is conceivable that the mounting element is configured such that when transferring the mounting element from its mounting position into its operating position, the mounting element levers the at least one bearing pin or bearing bolt according to the inclined plane principle at least regionally into a bearing eye formed in or at the first end region of the grip.

According to embodiments of the door handle assembly according to the invention, it is provided that, in the mounting state of the door handle assembly, the mounting element is held in a mounting position by the handle support preferably via a releasable latching or snapping connection. The mounting element is preferably held biased in its mounting position, in particular with the aid of a spring element.

According to embodiments, the spring element is embodied, in particular, as a double leg spring.

The spring element is configured, in particular, in order to bias the grip in a direction corresponding to its closed position after the transfer of the mounting element into its operating position.

According to the realizations of the door handle assembly according to the invention, connecting means are formed at the first end region of the grip, in particular in the form of latching connecting means, which are configured such that, upon insertion, in particular plugging, of the first end region of the grip into the channel- or shaft-shaped receiving region of the handle support, the connecting means can be brought into operative engagement with the mounting element or with the spring element preferably in a self-aligning and/or self-centering manner, in particular via a latching or snapping connection, such that when the grip is manipulated in its state of being inserted in the receiving region, which is formed in the handle support and is in particular channel- or shaft-shaped, and in particular upon pivoting of the grip relative to the handle support, the mounting element can be transferred from its mounting position into an operating position in which the mounting position of the mounting element, which is preferably realized as a latching or snapping connection, is lifted.

The mounting element is preferably affixed to the handle support and pivotably mounted relative to the handle support and the grip, and in particular relative to the first end region of the grip. Preferably, a pivot axis about which the mounting element is pivotably mounted relative to the handle support and the grip coincides with the pivot axis or at least runs parallel to the pivot axis about which the grip is pivotably mounted relative to the handle support in the operating state of the door handle assembly.

The invention further relates to a vehicle having a door or a flap and a door handle assembly of the type described above associated with the door or flap.

The invention further relates to a method for mounting a door handle assembly for a vehicle, wherein the door handle assembly comprises a handle support and a grip for opening a door or flap of the vehicle. The door handle assembly is configured in order to be transferable between a mounting state and an operating state.

For the mounting, the handle support is fastened to the door or flap on the inside or outside, and subsequently a first end region of the grip is inserted or plugged into a channel- or shaft-shaped receiving region formed in the handle support through a recess in the door or flap for affixing to the handle support. When inserting or plugging into the channel- or shaft shaped receiving region, the first end region of the grip enters into an operative connection with a mounting element of the door handle assembly. The mounting element is configured in order to be transferrable between a mounting state and an operating state and is configured in particular in order to form a pivot bearing for the pivotable bearing of the grip relative to the handle support during the change from the mounting state to the operating state.

In the method according to the invention, it is provided in particular that, in order to change from the mounting state into the operating state, the grip is moved, in particular pivoted, along with the mounting element operatively connected thereto via the first end region of the grip, in the direction of an open position of the grip.

BRIEF DESCRIPTION OF THE DRAWINGS

An exemplary embodiment of the door handle assembly according to the invention is described in further detail below, with reference to the accompanying drawings.

The following are shown.

DETAILED DESCRIPTION

Figure 1:
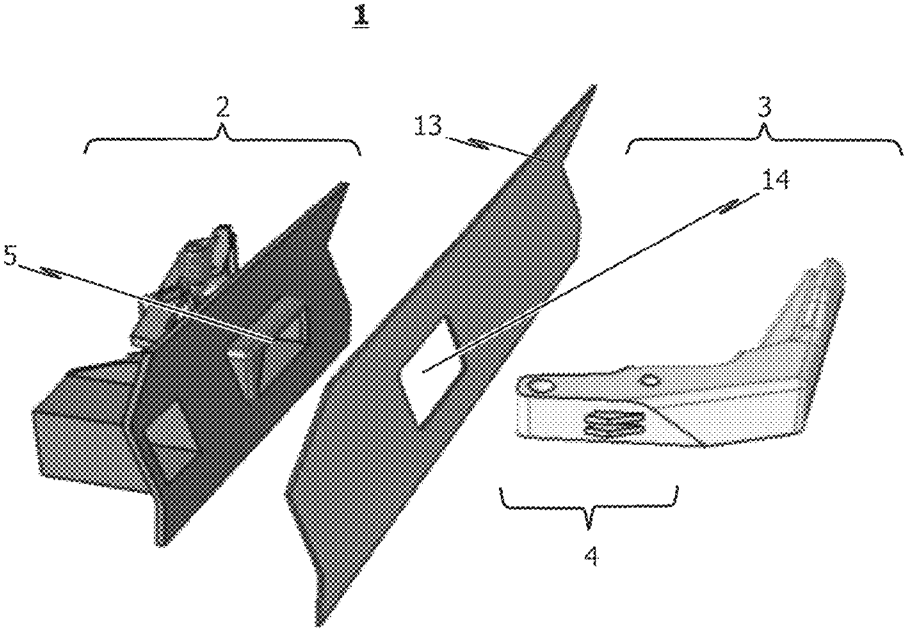
FIG. 1 shows schematically and in an isometric view, an exemplary embodiment of the door handle assembly according to the invention, wherein the door handle assembly is in its mounting state, the grip is not yet inserted or plugged into the channel- or shaft-shaped recess of the handle support, and the handle support is not yet fastened/mounted on the vehicle door or body component.

With reference to the accompanying drawings, an exemplary embodiment of the door handle assembly 1 according to the invention and a mounting method of the door handle assembly 1 according to the invention are described in further detail below.

The door handle assembly 1 according to the invention can be embodied as an inner or outer handle, wherein the exemplary embodiment shown in the drawings relates to a door handle assembly 1 for an inner door handle.

The door handle assembly 1 is thus, in particular, an inner door handle assembly, which serves to open and/or close a vehicle door, in particular proceeding from inside the vehicle. To this end, the door handle assembly 1 is mounted in the interior of a vehicle, such as a passenger vehicle or a commercial truck. The invention accordingly also relates to a vehicle having a door handle assembly 1 mounted therein.

As shown in the drawings, the exemplary embodiment of the door handle assembly 1 according to the invention comprises a handle support 2 via which a grip 3 for opening a door or flap of the vehicle is fastened or fastenable.

Figure 4:
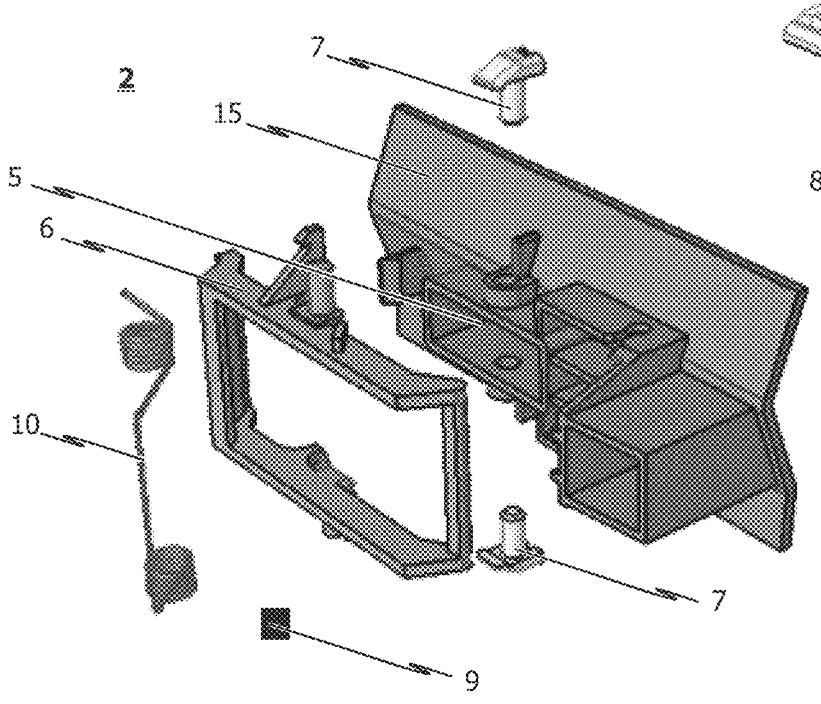
FIG. 4 shows schematically and in an isometric exploded view, the handle support of the exemplary embodiment of the door handle assembly according to the invention.

The handle support 2 shown schematically and in an exploded view in FIG. 4 essentially comprises a housing 15 in which two mutually opposed bearing pins or bearing bolt 7 are held. As will be described in further detail below, these bearing pins or bearing bolts 7 serve to form a pivot bearing in the operating state of the door handle assembly 1, via which bearing the grip 3 is pivotably mounted relative to the handle support 2 about a pivot axis specified by the pivot bearing.

The handle support 2 further comprises a mounting element 6, which is pivotably mounted on the handle support 2 about a pivot axis relative to the handle support 2. The mounting element 6 serves to transfer the door handle assembly 1 or the handle support 2 of the door handle assembly 1 from a mounting state into an operating state.

The mounting element 6 is further associated with a spring element 10, which, in the exemplary embodiment shown in the drawings, is embodied in particular as a double leg spring.

Moreover, attenuating elements 9 preferably consisting of an elastomeric material can be provided in order to attenuate the movement of the grip 3 relative to the handle support 2 in the operating state of the door handle assembly 1.

Figure 5:
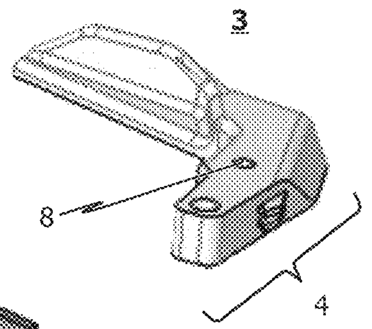
FIG. 5 shows schematically and in an isometric detail view, the grip of the exemplary embodiment of the door handle assembly according to the invention.

The grip 3 of the exemplary embodiment of the door handle assembly 1 according to the invention is shown schematically and by itself in FIG. 5.

The grip 3 serves as an actuating portion, which a vehicle occupant can manually actuate, for example by gripping. In the operating state of the door handle assembly 1, the grip 3 is movably, in particular pivotably, mounted on the handle support 2, wherein a translational movement of the grip 3 relative to the handle support 2 is generally also conceivable.

The grip 3 is, for example, a handle lever pivotably mounted on the handle support 2. However, the grip 3 can also be, for example, a button or the like actuated by a vehicle occupant. The grip 3 can be configured in order to be actuated by a vehicle occupant, in particular, in order to open and/or close a vehicle door, in particular from the inside.

The grip 3 of the exemplary embodiment of the door handle assembly 1 according to the invention shown in the drawings has a first end region 4, which is configured in order to be inserted, and in particular plugged, into a channel- or shaft-shaped receptacle 5 of the handle support 2.

The grip 3 comprises two opposing bearing eyes 8, which are configured to be at least regionally complementary to the two bearing pins/bearing bolts 7 of the handle support 2.

As will be described in further detail below, when changing from the mounting state into the operating state of the door handle assembly 1, the bearing pins/bearing bolts 7 are retracted into the correspondingly associated bearing eyes 8 of the grip 3, so as to form the pivot bearing, via which the grip 3 is pivotably mounted relative to the handle support 2 about a pivot axis specified by the pivot bearing in the operating state of the door handle assembly 1.

Figure 2:
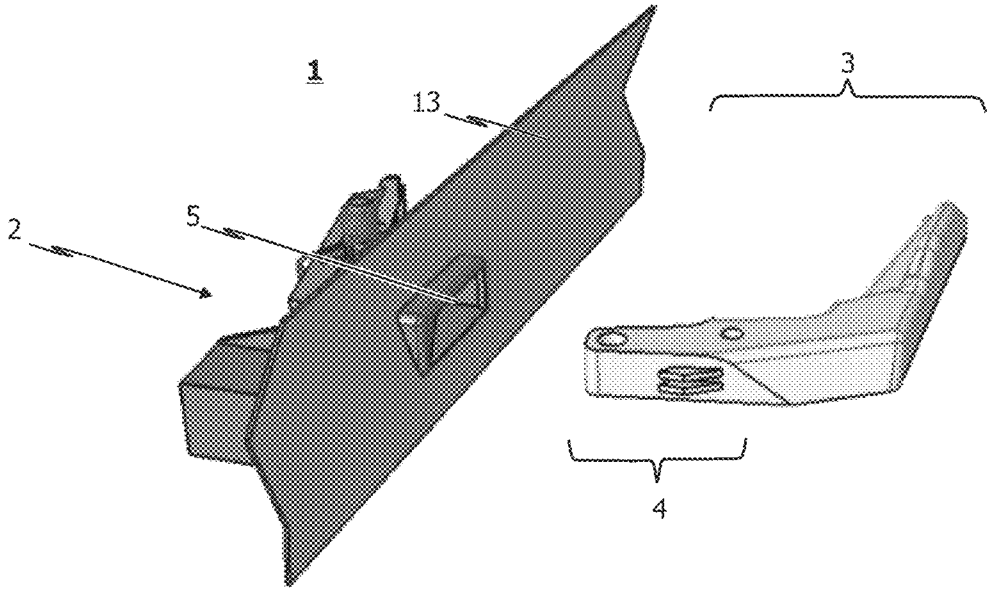
FIG. 2 shows schematically and in an isometric view, the exemplary embodiment of the door handle assembly according to the invention, wherein the door handle assembly is in its mounting state, the grip is not yet inserted and in particular plugged into the channel- or shaft-shaped receiving region of the handle support, and the handle support is fastened/mounted to the door or body component.
Figure 3:
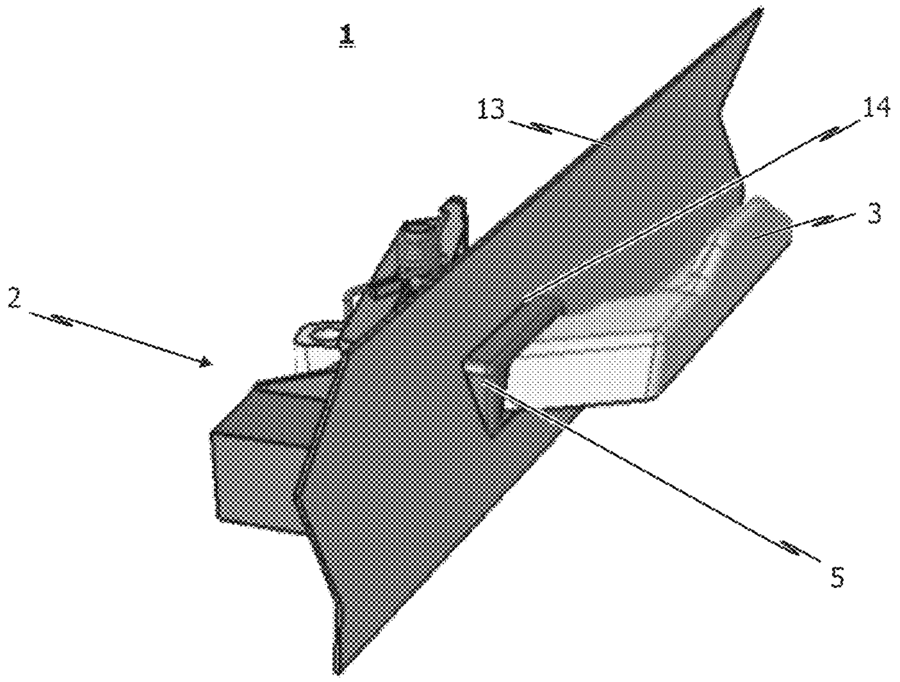
FIG. 3 shows schematically and in an isometric view, the exemplary embodiment of the door handle assembly according to the invention upon changing the door handle assembly from the mounting state to an operating state in which the grip is inserted or plugged into the channel- or shaft-shaped receptacle of the handle support.

As shown schematically in FIG. 1 to FIG. 3, in order to mount the door handle assembly 1, the handle support 2 is fastened on the inside or outside of the door or corresponding body component 13 of the door.

The first end region of the grip 3 is subsequently inserted, and in particular plugged, into the channel- or shaft-shaped receiving region 5 formed in the handle support 2 through a recess or opening 14 in the door or in the body component 13 of the door for affixing to the handle support 2.

Upon insertion or plugging into the channel- or shaft-shaped receiving region 5, the first end region 4 of the grip 3 enters into operative connection with the aforementioned mounting element 6 of the handle support 2. The mounting element 6 itself is configured in order to be transferable between a mounting state and an operating state. In particular, the mounting element 6 is configured in order to form the pivot bearing for the pivotable bearing of the grip 3 relative to the handle support 2 when changing from the mounting state to the operating state.

For this purpose, the mounting element 6 manipulates the two mutually opposed bearing pins or bearing bolts 7 such that the pivot bearing for pivotable mounting of the grip 3 relative to the handle support 2 is formed with the two bearing pins or bearing bolts 7 and the correspondingly associated bearing eyes 8 of the grip 3.

Figure 6:
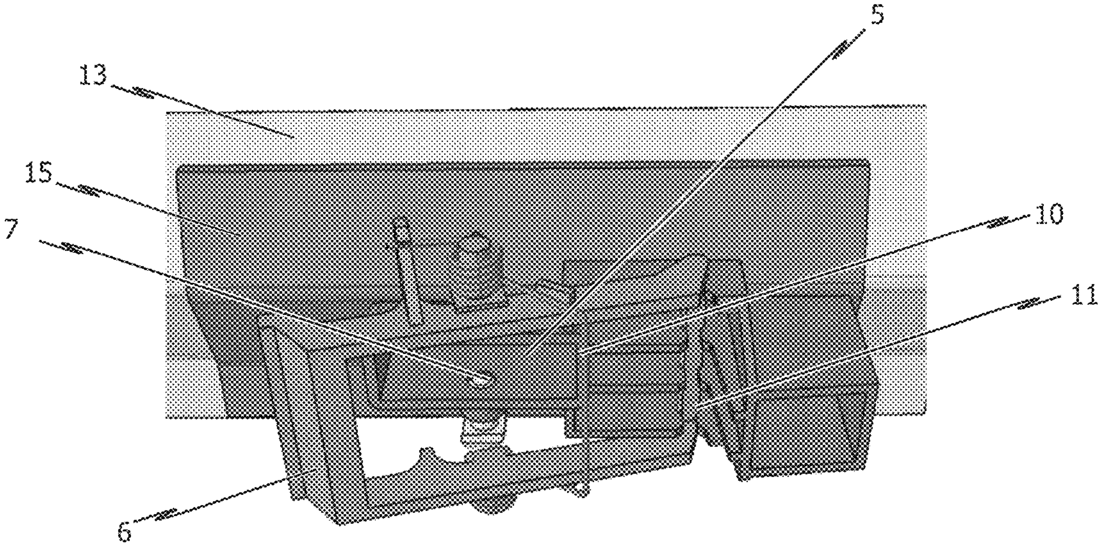
FIG. 6 shows schematically and in an isometric view, the handle support of the exemplary embodiment of the door handle assembly according to the invention, wherein the handle support is in a mounting state and is fastened/mounted to the vehicle door or body component.
Figure 7:
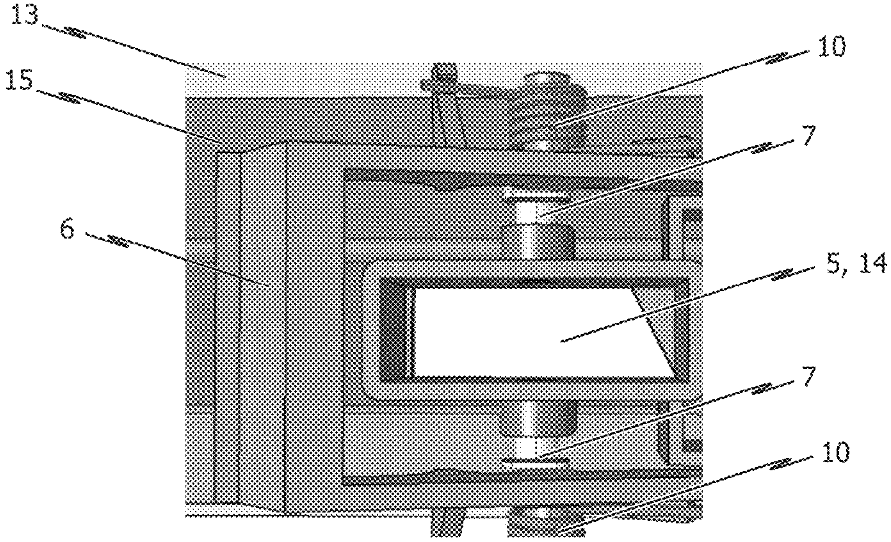
FIG. 7 shows a further schematic, isometric view of the handle support according to FIG. 6.

As can be seen, in particular, from the illustrations in FIG. 6 and FIG. 7, in the mounting state of the door handle assembly 1, the mounting element 6 is held in a mounting position by the handle support 2 via a releasable latching or snapping connection 11. A spring element 10 in the form of the aforementioned double leg spring is also used in order to hold the mounting element 6 biased in its mounting position.

At the first end region 4 of the grip 3, there are connecting means 12, preferably in the form of latching or snapping connecting means, which serve to enter into operative connection with the mounting element 6 or with the center leg of the double leg spring 10 preferably in a self-aligning and/or self-centering manner upon insertion, in particular plugging, of the first end region 4 of the grip 3 into the channel- or shaft-shaped receiving region of the handle support 2.

Figure 8:
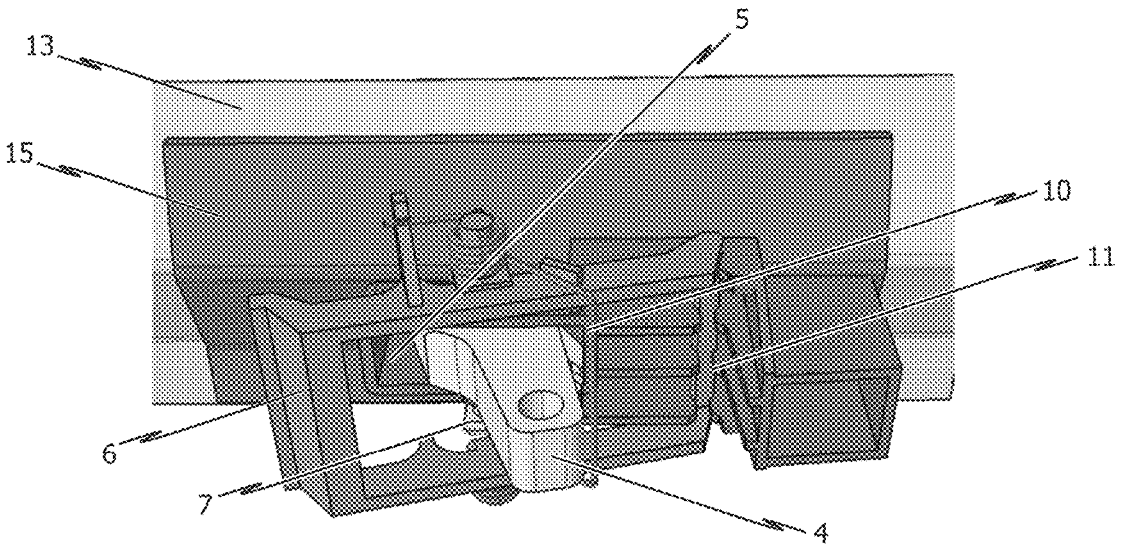
FIG. 8 shows schematically and in an isometric view, the handle support according to FIG. 4, wherein a first end region of the grip is already inserted/plugged into the channel- or shaft-shaped recess of the handle support.
Figure 9:
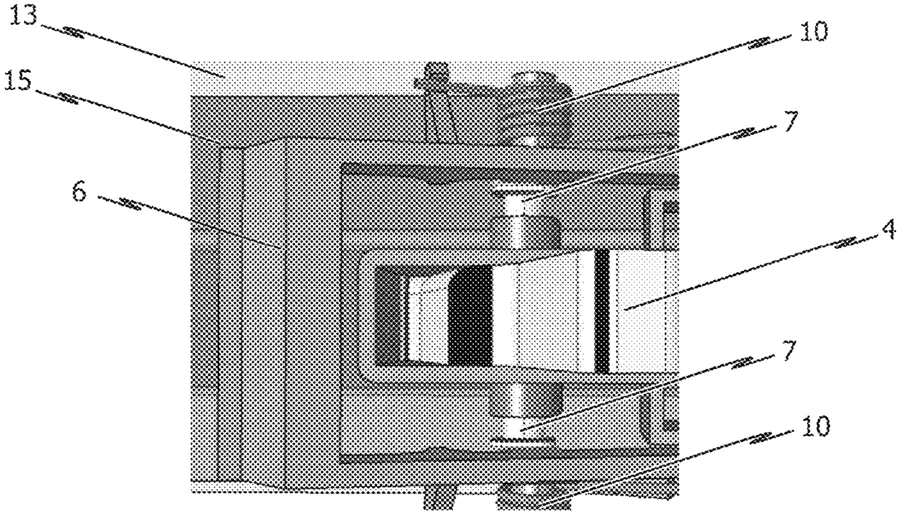
FIG. 9 shows schematically and in a further isometric view, the handle support according to FIG. 8.

In FIG. 8 and FIG. 9, respectively, a state is shown in which the connecting means at the first end region 4 of the grip 3 are standing shortly before the formation of an operative engagement with the center leg of the double leg spring 10.

Figure 10:
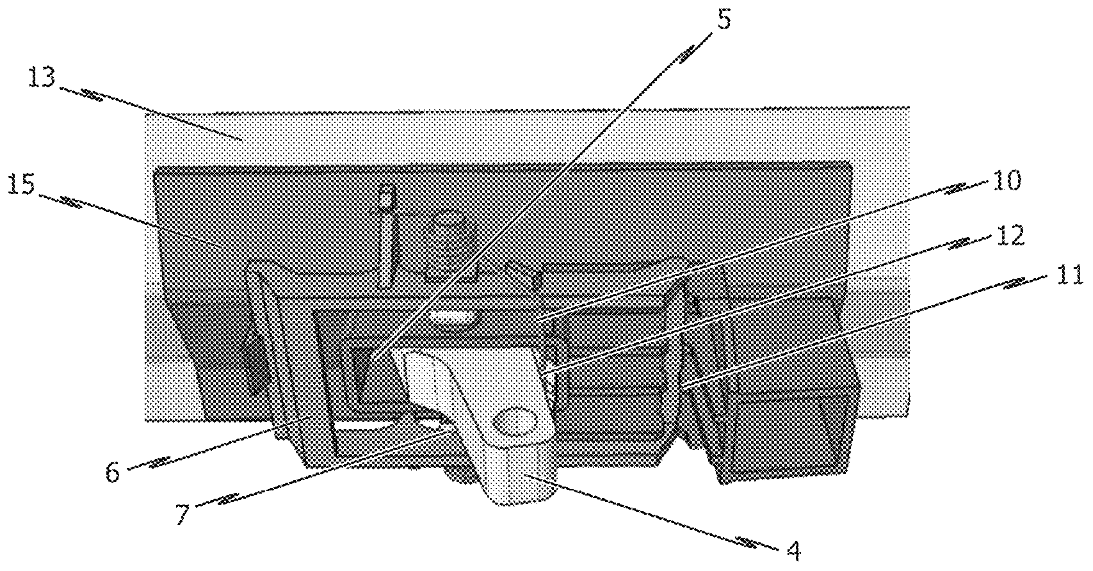
FIG. 10 shows schematically and in an isometric view, the handle support according to FIG. 6, namely in a state in which the first end region of the grip is operatively connected to a mounting element of the handle support.
Figure 11:
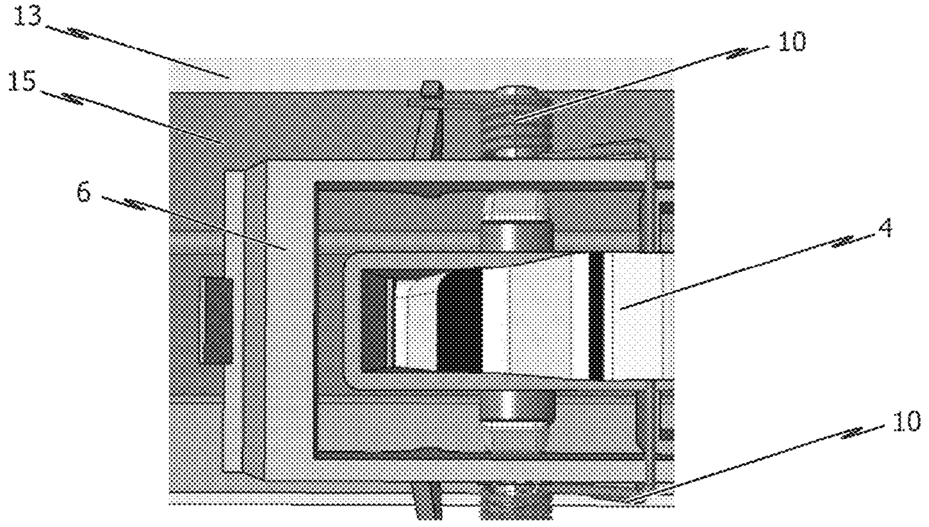
FIG. 11 shows schematically and in a further isometric view, the handle support according to FIG. 10.
Figure 12:
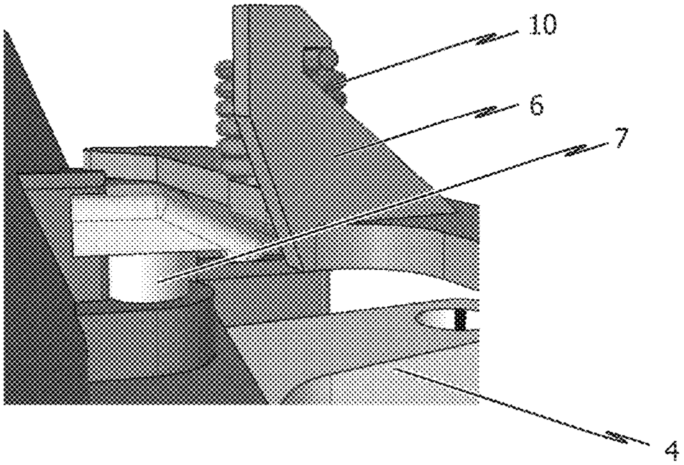
FIG. 12 shows schematically and in an isometric view, a region of the handle support with a bearing pin or a bearing journal that is not yet activated/manipulated with the aid of the mounting element for forming a pivot bearing for the grip.
Figure 13:
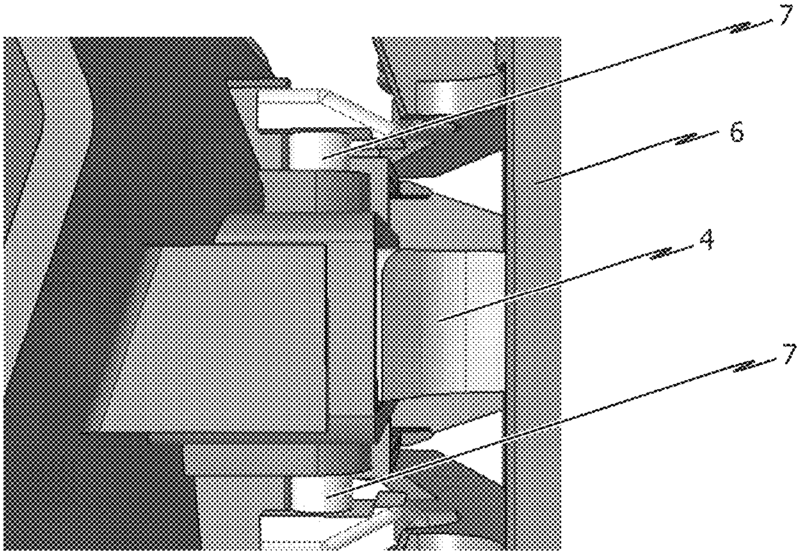
FIG. 13 shows schematically and in an isometric view, a region of the handle support with two mutually opposed bearing pins or bearing bolts that are not yet activated/manipulated with the aid of the mounting element for forming the pivot bearing for the grip.
Figure 14:
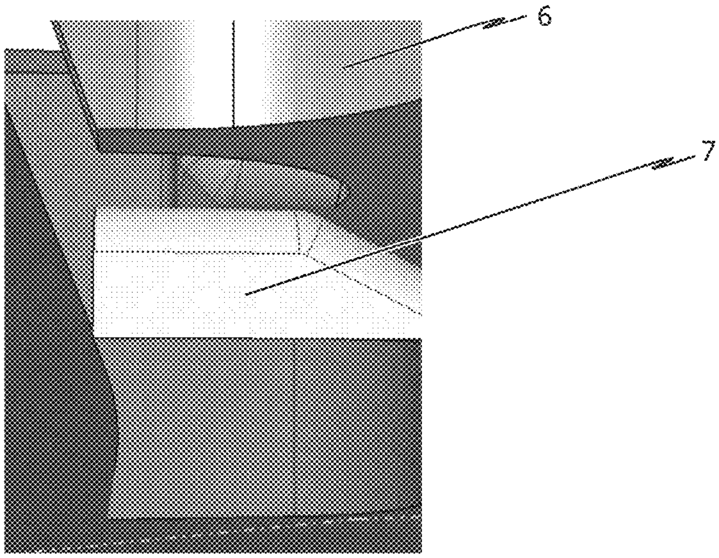
FIG. 14 shows schematically and in an isometric view, the region of the handle support according to FIG. 12, however this time in a state in which the bearing pin/bearing bolt is already manipulated with the aid of the mounting element and forms the pivot bearing for the grip of the door handle assembly.
Figure 15:
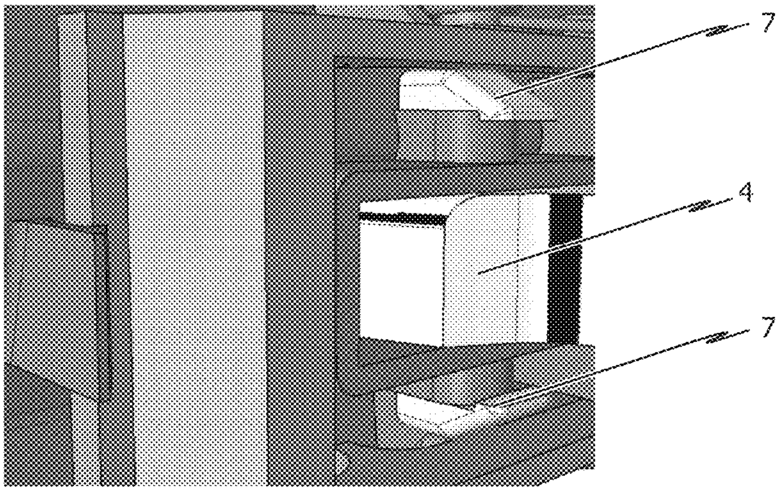
FIG. 15 shows schematically and in an isometric view, the region of the handle support according to FIG. 11, namely this time in a state in which both bearing pins or bearing bolts are already manipulated by the mounting element and form the pivot bearing for the grip.
Figure 16A:
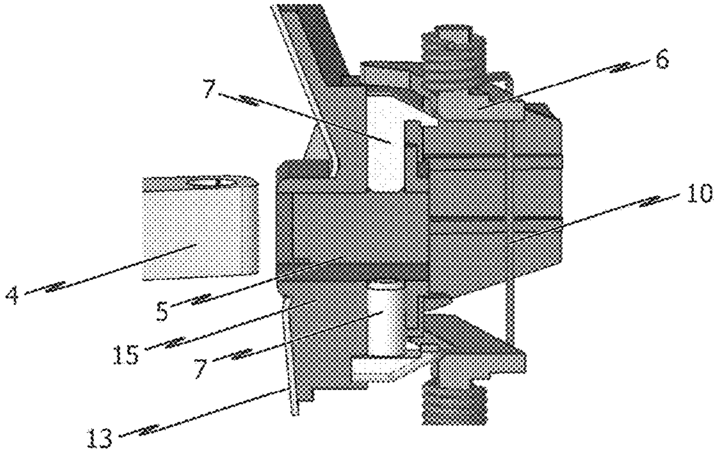
FIG. 16A-16C show schematically and in a sectional view, respectively, the sequence of how the exemplary embodiment of the door handle assembly according to the invention is transferable from its mounting state (FIG. 16A) into its operating state (FIG. 16C)
Figure 16B:
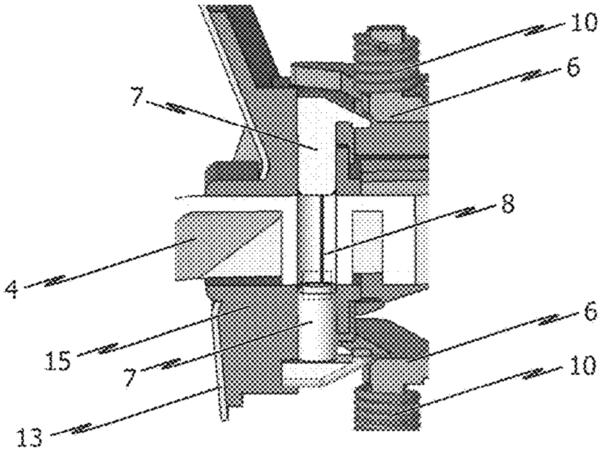
Figure 16C:
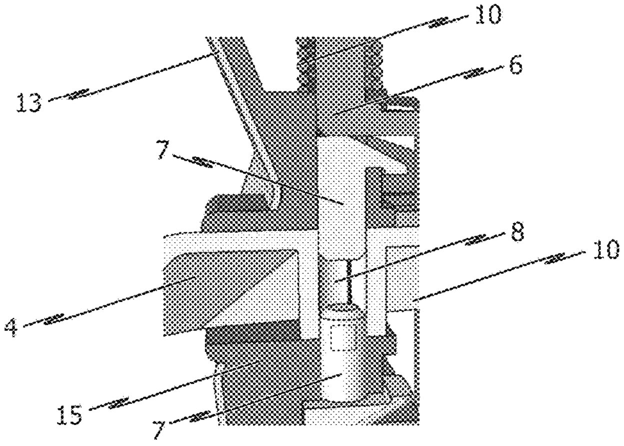
Figure 17:
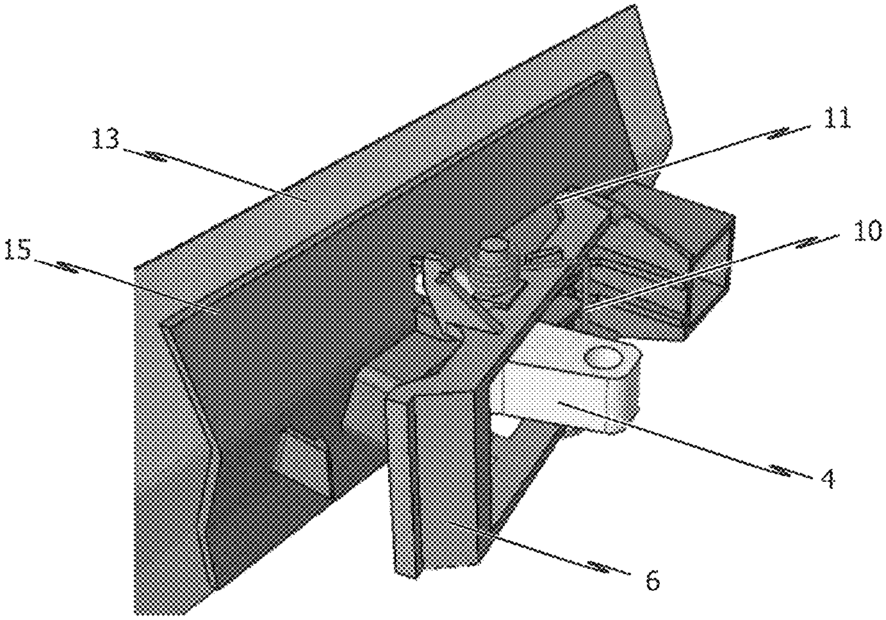
FIG. 17 shows schematically and in an isometric view, the handle support of the exemplary embodiment of the door handle assembly according to the invention, wherein the door handle assembly is in its mounting state and the first end region of the grip is already inserted into the channel- or shaft-shaped recess of the handle support but is not yet in operative connection with the mounting element.
Figure 18:
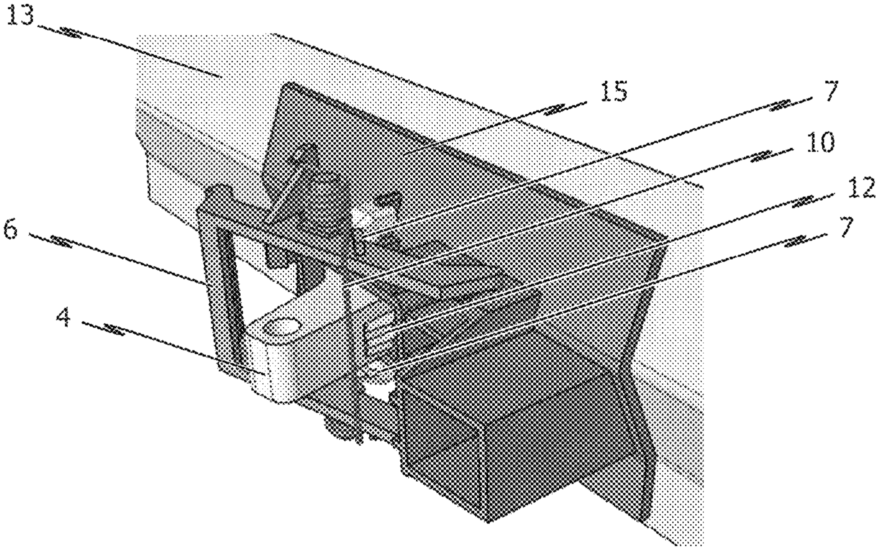
FIG. 18 shows schematically, a further isometric view of the handle support according to FIG. 17.
Figure 19:
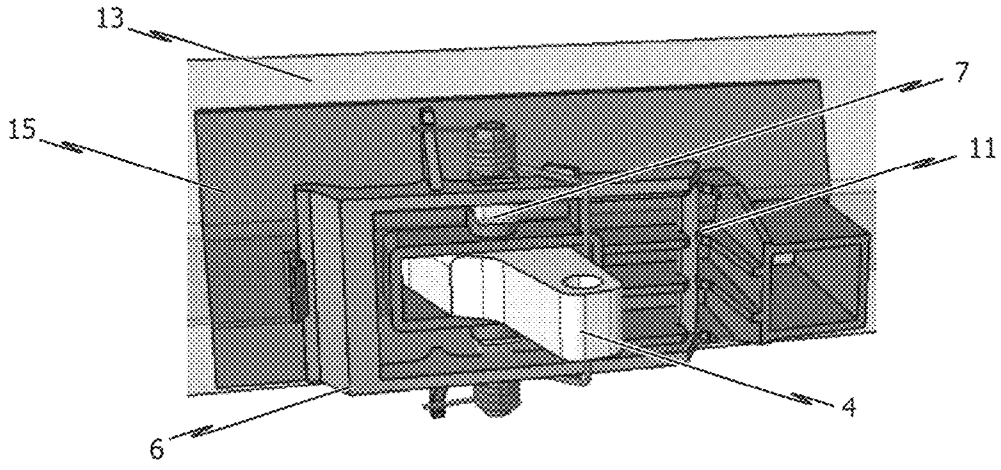
FIG. 19 shows schematically and in an isometric view, the handle support according to FIG. 15, wherein however the door handle assembly is in its operating state.
Figure 20:
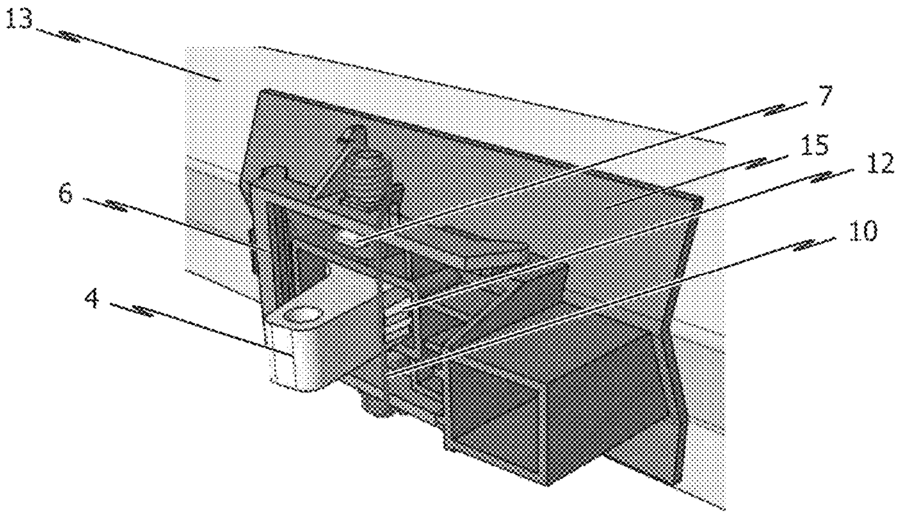
FIG. 20 shows schematically, a further isometric view of the door handle assembly according to FIG. 19.

After the first end region of the grip 3 is connected to the center leg of the double leg spring 10, the latching or snapping connection, with which the mounting element 6 is held on the handle support 2 in the mounting state of the door handle assembly 1, is released. By a pivoting of the grip 3, the mounting element 6 operatively connected to the first end region 4 of the grip 3 is pivoted along and ultimately latches, as can be seen in FIG. 10 and FIG. 11. Due to the pivoting of the mounting element 6, the bearing pins or bearing journals 7 are manipulated, as can be seen in particular from the sequence in FIG. 16A to 16C.

In detail, when transferring the mounting element 6 from its mounting position (see FIG. 6) into its operating position (see FIG. 10), the mounting element levers the bearing pins or bearing bolts 7 according to the inclined plane principle at least regionally into the bearing eyes 8 that are formed in or at the first end region 4 of the grip 3.

The invention is not limited to the exemplary embodiments of the door handle assembly 1 according to the invention as shown in the drawings, but rather results when all of the features disclosed herein are considered together.

LIST OF REFERENCE NUMERALS

1 Door handle assembly
2 Handle support
3 Grip
4 First end region of the grip
5 Channel- or shaft-shaped receiving region of the handle support 6 Mounting element
7 Bearing pin/bearing bolt
8 Bearing eye
9 Attenuator
10 Spring element/double leg spring
11 Latching or snapping connection of the mounting element
12 Latching or snapping connection at the first end region of the grip
13 Body component
14 Opening in the body component
15 Housing

The invention claimed is:

1. A door handle assembly for a vehicle, wherein the door handle assembly comprises:

a handle support and a grip for opening a door or flap of the vehicle, wherein the door handle assembly is configured in order to be transferable between a mounting state and an operating state by a mounting element, which is pivotably fastened to the handle support, wherein, at least one first end region of the grip is configured in order to be channel-shaped or shaft-shaped, wherein, in the operating state of the door handle assembly, at least one bearing pin or bearing bolt is in a position in engagement with the grip to form a pivot bearing about which the grip is pivotably mounted, wherein, in the operating state of the door handle assembly, a portion of the mounting element axially overlies and contacts an end of the at least one bearing pin or bolt to axially retain the at least one bearing pin or bolt in engagement with the grip.

2. The door handle assembly according to claim 1, wherein, in the operating state of the door handle assembly, the at least one bearing pin or bearing bolt interacts with a bearing eye formed or provided in or at the first end region of the grip to form the pivot bearing.

3. The door handle assembly according to claim 1, wherein the at least one bearing pin or bearing bolt comprises a head region having an insertion slope, wherein the mounting element comprises a region configured in order to be complementary to the insertion slope such that when the mounting element is transferred out of a mounting position into an operating position a rotational movement of the mounting element causes a linear displacement of the at least one bearing pin or bearing bolt into engagement with the grip.

4. The door handle assembly according to claim 3, wherein the mounting element is configured such that when transferring the mounting element from its mounting position into its operating position, the mounting element levers the at least one bearing pin or bearing bolt according to the inclined plane principle at least regionally into a bearing eye formed in or at the first end region of the grip.

5. The door handle assembly according to claim 1, wherein, in the mounting state of the door handle assembly, the mounting element is held in a mounting position by the handle support via a releasable latching or snapping connection, wherein the mounting element is held biased in its mounting position with the aid of a spring element.

6. The door handle assembly according to claim 5, wherein the spring element is configured as a double leg spring.

7. The door handle assembly according to claim 5, wherein connecting means are formed at the first end region of the grip, in the form of latching or snapping connecting means, which are configured such that, during transfer of the handle assembly from the mounting state to the operating state the connecting means come into operative engagement with the mounting element and/or into an operative connection with the spring element in a self-aligning and/or self-centering manner, via a latching or snapping connection, such that the mounting element is transferred from its mounting position into an operating position.

8. The door handle assembly according to claim 7, wherein the spring element is configured in order to bias the grip into a direction corresponding to a closed position after the transition of the mounting element into its operating position with the first end region of the grip operatively connected thereto.

9. The door handle assembly according to claim 5, wherein the mounting element is fastened to the handle support and is pivotably mounted relative to the handle support for pivot about a pivot axis that runs parallel to a pivot axis defined by the pivot bearing.

10. A vehicle having a door or a flap and a door handle assembly according to claim 1 associated with the door or flap.

11. A method of assembling a door handle assembly for a vehicle, wherein the door handle assembly comprises a handle support and a grip for opening a door or flap of the vehicle, and wherein the door handle assembly is configured in order to be transferable between a mounting state and an operating state, wherein, for the mounting, the handle support is fastened internally or externally to the door or flap and subsequently a first end region of the grip is inserted or plugged in through a recess in the door or flap for fastening at the handle support in a receiving region configured in the handle support and configured in order to be channel-shaped or shaft-shaped, wherein, upon insertion or plugging into the channel-shaped or shaft-shaped receiving region, the at least one first end region of the grip enters into operative connection with a mounting element of the door handle assembly, wherein the mounting element is configured in order to be transferable between a mounting position and an operating position, wherein a bearing bolt or pin on the channel-shaped region is located to align with a bearing eye of the at least one first end region of the grip, wherein a surface portion of the mounting element contacts and interacts with a surface portion of the bearing bolt or pin as the mounting element moves from the mounting position to the operating position such that transfer of the mounting element from the mounting position to the operating position causes the bearing bolt or pin to move axially into the bearing eye forming a pivot bearing about which the grip is pivotable relative to the handle support.

12. The method according to claim 11, wherein, in order to change from the mounting state into the operating state, the grip is pivoted along with the mounting element operatively connected thereto via the first end region of the grip in a direction of an open position of the grip.

* * * * *